(12) United States Patent
Cerecke

(10) Patent No.: US 12,351,727 B2
(45) Date of Patent: Jul. 8, 2025

(54) SEALANT COMPOSITION AND ZERO DISCHARGE IMPREGNATION PROCESS

(71) Applicant: DLM Holding Group LLC, Bridgeman, MI (US)

(72) Inventor: Brandon Cerecke, Bridgeman, MI (US)

( * ) Notice: Subject to any disclaimer, the term of this patent is extended or adjusted under 35 U.S.C. 154(b) by 1211 days.

(21) Appl. No.: 16/969,646

(22) PCT Filed: Feb. 14, 2019

(86) PCT No.: PCT/US2019/017928
§ 371 (c)(1),
(2) Date: Aug. 13, 2020

(87) PCT Pub. No.: WO2019/161006
PCT Pub. Date: Aug. 22, 2019

(65) Prior Publication Data
US 2020/0399501 A1    Dec. 24, 2020

Related U.S. Application Data

(60) Provisional application No. 62/630,384, filed on Feb. 14, 2018.

(51) Int. Cl.
*C09D 133/06* (2006.01)
*B01D 17/04* (2006.01)
*C09D 4/06* (2006.01)

(52) U.S. Cl.
CPC ....... *C09D 133/066* (2013.01); *B01D 17/045* (2013.01); *C09D 4/06* (2013.01)

(58) Field of Classification Search
CPC .............................. C09D 133/066; C09D 4/06
See application file for complete search history.

(56) References Cited

U.S. PATENT DOCUMENTS

| | | | |
|---|---|---|---|
| 5,417,809 A | 5/1995 | Hoffman et al. | |
| 6,299,975 B1 * | 10/2001 | Takahira | C09J 133/06 524/833 |
| 6,712,910 B1 | 3/2004 | Newberth, III et al. | |
| 6,984,292 B2 | 1/2006 | Kresnyak et al. | |
| 2006/0234074 A1 * | 10/2006 | Yun | C09J 133/04 428/500 |
| 2015/0191607 A1 | 7/2015 | McDaniel | |
| 2016/0002486 A1 | 1/2016 | Kuntz et al. | |
| 2016/0122473 A1 * | 5/2016 | Monnier | C08G 71/04 523/400 |
| 2017/0025485 A1 * | 1/2017 | Kim | C09J 133/06 |

FOREIGN PATENT DOCUMENTS

| | | |
|---|---|---|
| KR | 20060019750 A | 3/2006 |
| KR | 101192596 B1 | 10/2012 |
| WO | 2005080492 A1 | 9/2005 |

OTHER PUBLICATIONS

International search report for PCT/US19/17928, mailed Apr. 15, 2019, 74 pages.
Mahmood, ME., Effect of temperature changes on critical micelle concentration for tween series surfactant. Global Journal of Science Frontier Research Chemistry, 2013, vol. 13, No. 4, version 1, 8 pgs; ISSN: 2249-4626 (online); 0975-5896 (print).
Extended European Search Report for EP Application 19754831.6, dated Feb. 8, 2022, 11 pages.

* cited by examiner

*Primary Examiner* — Wenwen Cai

(57) ABSTRACT

A composition for an impregnation sealant for sealing metal castings and the like is provided, wherein the composition comprises a first monofunctional (meth)acrylate ester; a second monofunctional (meth)acrylate ester; a trifunctional monomer; and from about 5 wt % to about 20 wt % of an epoxidized soy bean oil oligomer. Also described is a zero discharge process of rinsing sealant from an impregnated article, separating sealant from the rinse water, and recycling the sealant and rinse water for reuse.

7 Claims, 4 Drawing Sheets

Figure 1A:
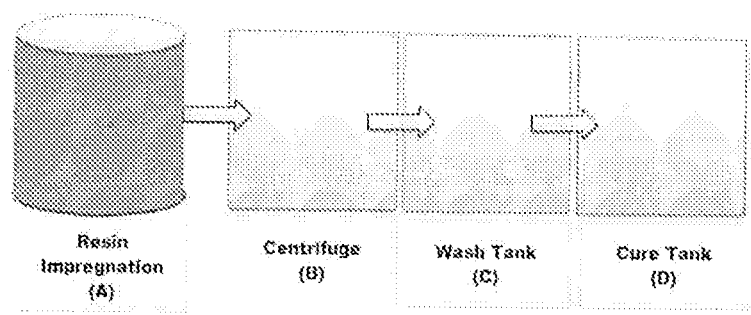

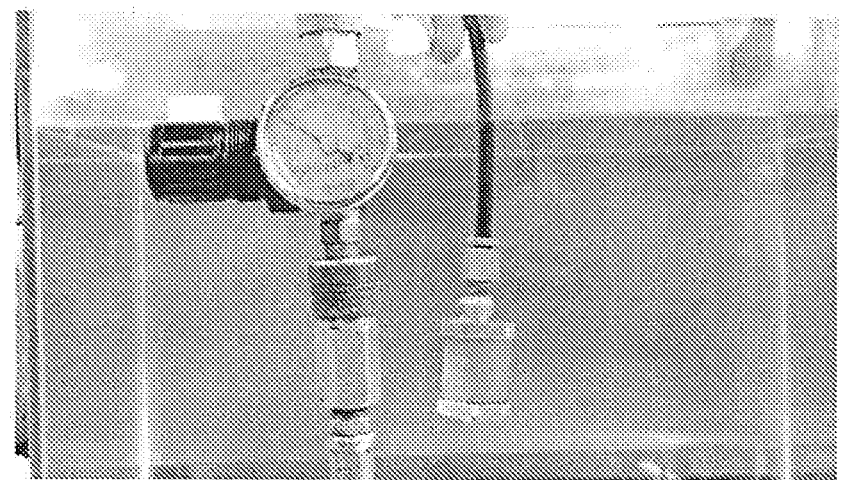
Ultra Seal 1955/R after Thermal Degradation Test
A
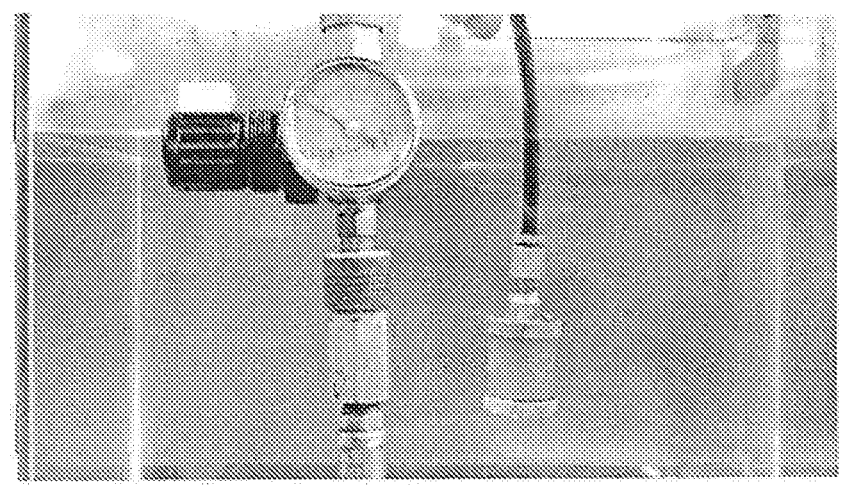
FlexSeal Me2 after Thermal Degradation Test
B
FIG. 3 A, B

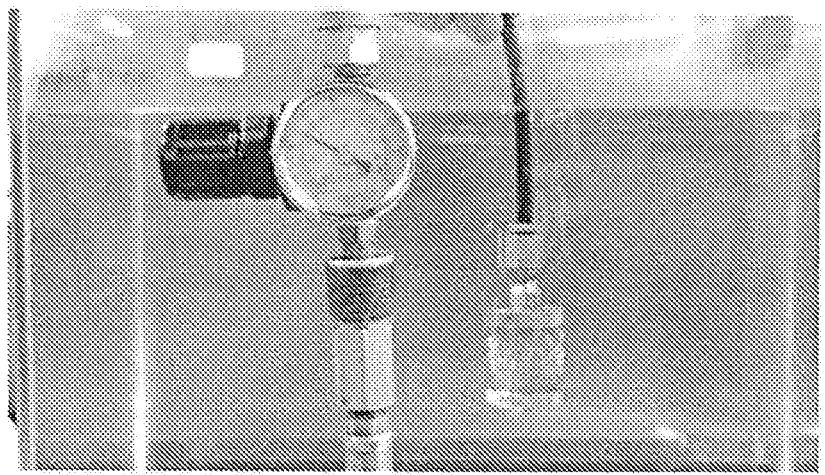
Ultraseal PC504-66 after Thermal Degradation Test
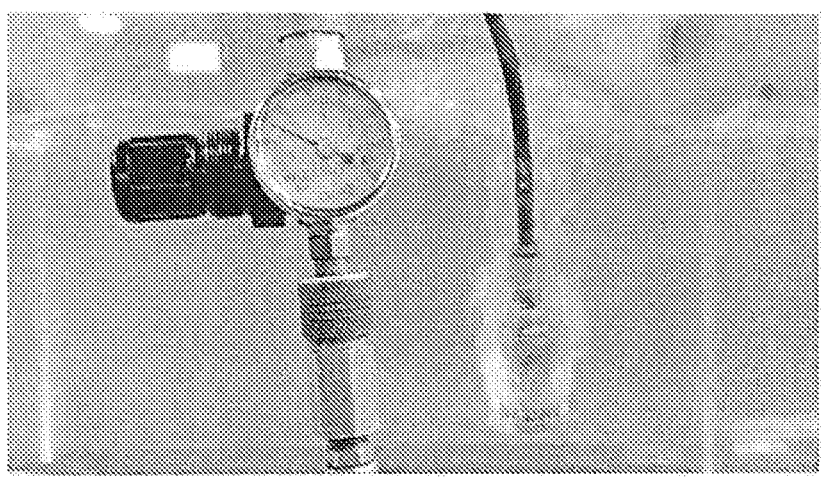
Imprex 95-1000A after Thermal Degradation Test
FIG. 3 C, D

SEALANT COMPOSITION AND ZERO DISCHARGE IMPREGNATION PROCESS

PRIORITY CLAIM

This application is a national phase application of PCT/US2019/017928 filed Feb. 14, 2019, which claims priority to U.S. Provisional Patent Application Number 62,630,384 filed Feb. 14, 2018. The entire contents of the aforementioned applications are incorporated herein by reference.

FIELD

The present disclosure relates to a composition for an impregnation sealant for sealing metal castings and the like. The present disclosure also relates to a zero discharge process of rinsing sealant from an impregnated article, separating sealant from the rinse water, and recycling the sealant and rinse water for reuse.

BACKGROUND

The impregnation process has been covered and referenced many times in patent filings. It is a well-known process that can be certified to a Mil Spec (MIL-STD-276A) with the sealant qualified to MIL-I-17563C and listed on QPL-17563C.

Sealant compositions typically employed in these impregnation applications include a wide variety of self-curing anaerobic sealants, which are curable through free radical polymerization in the presence of suitable free radical initiators, e.g., peroxy type initiators, as well as thermal curing sealants, as well as sealants which cure by both anaerobic and heat cure mechanisms.

Impregnation sealant compositions are typically impregnated into the porosity of porous parts by vacuum and pressure techniques. A vacuum removes air from the porosity of the metal parts. Sealant compositions are then introduced into the porosity under a pressure differential using ambient pressure or elevated pressure conditions. After impregnation, an operation, such as a centrifuge operation, removes excess surface sealant from the metal part. Even after removing gross surface accumulations of the sealant, a significant amount of sealant remains on the surface of the porous parts, particularly in the vicinity of the pores. When the sealant is an anaerobically curable one, the surface accumulations as well as the outermost layer of the sealant in the pores of the parts, particularly shallow surface pores, contact oxygen, so that surface quantities of the impregnate remains uncured or only partially cured.

Remaining surface sealant or sealant trapped in blind holes of the impregnated parts is typically removed in an agitated water rinse zone. The impregnated and water rinsed parts may be transferred to an activator zone in which the impregnated parts are contacted with a catalyst activator solution (in the case of anaerobic sealants curing) or passed to a tank containing hot water, e.g., at a temperature of 90° C. to 150° C. (in the case of heat curing sealants) to effect curing of the sealant material at the entrance to the pores in the parts. Thereafter, the impregnated parts may be transferred to a final rinse zone for removal of the activator solution from the impregnated parts.

Whether the resin is heat curing or anaerobic curing, the problem of excess resin in the rinse water exists. In the past, the problem has been dealt with through wastewater treatment process or systems. The problem has been addressed through emulsifying the resin in the rinsewater for subsequent treatment. In these impregnation compositions and systems, either organic solvents or specific surfactants are used to remove uncured sealant in a reasonable rinse time and/or specific multi-component sealant compositions are used to avoid excessive rinse times.

Overall, the known sealant compositions and rinsing/recycling systems have limitations with sealant performance and efficiency of separation of sealant from the rinse water. Accordingly, it would be desirable to provide a high performance impregnation sealant composition that could be readily separable from rinsewater in its uncured state and that could operate in a zero discharge system.

SUMMARY

One aspect of the invention is a sealant composition comprising a first monofunctional (meth)acrylate ester; a second monofunctional (meth)acrylate ester; a trifunctional monomer; and from about 5 wt % to about 20 wt % of an epoxidized soy bean oil oligomer.

This or other aspects may include one or more of the following optional features. In some embodiments, the second monofunctional (meth)acrylate ester is 2-hydroxypropyl methacrylate (HPMA) and the HPMA is present in a concentration of less than about 50 wt % in the sealant composition. In some embodiments, the HPMA is present in a concentration of less than about 30 wt % in the sealant composition. In some embodiments, the epoxidized soy bean oil oligomer is present in a concentration of from about 6 wt % to about 12 wt %. In some embodiments, the first monofunctional (meth)acrylate ester is c12 c14 alkyl methacrylate. In some embodiments, the first monofunctional (meth)acrylate ester is lauryl methacrylate. In some embodiments, the trifunctional monomer is trimethylolpropane trimethacrylate. The sealant composition may further comprise a surfactant. The sealant composition may further comprise a stabilizer.

Another aspect of the invention is an anaerobic and thermal curing sealant composition comprising a first monofunctional (meth)acrylate ester; a second monofunctional (meth)acrylate ester; a trifunctional monomer; and a stabilizer; wherein the sealant composition cures only upon both of (a) heating the sealant composition and (b) depriving the sealant composition of oxygen.

This or other aspects may include one or more of the following optional features. In some embodiments, the stabilizer is butylated hydroxy toluene (BHT). In some embodiments, the first monofunctional (meth)acrylate ester is c12 c14 alkyl methacrylate. In some embodiments, the first monofunctional (meth)acrylate ester is lauryl methacrylate. In some embodiments, the second monofunctional (meth)acrylate ester is 2-hydroxypropyl methacrylate (HPMA). The sealant composition may further comprise an epoxidized soy bean oil oligomer. The sealant composition may further comprise a surfactant.

Another aspect of the invention is a sealant composition comprising a first monofunctional (meth)acrylate ester; a second monofunctional (meth)acrylate ester; a trifunctional monomer; and one or more surfactants; wherein the one or more surfactants act as an emulsifier below a first temperature and as a detergent above the first temperature.

This or other aspects may include one or more of the following optional features. In some embodiments, the sealant composition further comprises a first surfactant and a second surfactant, wherein the first surfactant is an oil soluble surfactant and the second surfactant is a water soluble surfactant. In some embodiments, the first monofunctional (meth)acrylate ester is c12 c14 alkyl methacrylate. In some embodiments, the first monofunctional (meth) acrylate ester is lauryl methacrylate. In some embodiments, the second monofunctional (meth)acrylate ester is 2-hydroxypropyl methacrylate (HPMA). The sealant composition may further comprise an epoxidized soy bean oil oligomer. The sealant composition may further comprise a stabilizer.

Another aspect of the invention is a zero discharge process for rinsing an impregnated article with rinse water and recycling the rinse water, the process comprising providing a sealant composition (e.g., as described herein), impregnating an article with the sealant composition; rinsing the impregnated article with a rinse stream comprising water, thereby introducing sealant composition into the rinse stream; separating the sealant composition in the rinse stream from the water; recycling the rinse stream water and the sealant for reuse in an impregnation process; wherein greater than about 98% of the rinse water is reused and not discharged to a sewer.

This or other aspects may include one or more of the following optional features. In some embodiments, the rinse stream is used multiple times to rinse multiple impregnated articles, and greater than 98% of the rinse water is recycled multiple times to rinse multiple impregnated articles. In some embodiments, no replacement water is added to the rinse stream except to replace minor losses due to drag out and evaporation. In some embodiments, separating the sealant composition from the water comprises stagnating the rinse stream or passing the rinse stream through a coalescer. In some embodiments, the sealant composition in the rinse stream is exposed to oxygen in air, in the rinse water, or both.

Another aspect of the invention is a sealant composition comprising c12 c14 alkyl methacrylate; 2-hydroxypropyl methacrylate (HPMA); trimethylolpropane trimethacrylate; epoxidized soy bean oil oligomer; one or more surfactants; and butylated hydroxy toluene.

This or other aspects may include one or more of the following optional features. In some embodiments, the concentration of HPMA is less than about 40 wt %. In some embodiments, the concentration of epoxidized soy bean oil oligomer is from about 5 wt % to about 20 wt %.

Another aspect of the invention is a zero discharge process for rinsing an impregnated article with rinse water and recycling the rinse water, the process comprising rinsing an article impregnated with sealant with a rinse stream comprising water, thereby removing excess sealant from the article, and thereby forming a water/sealant emulsion of the water and the excess sealant; introducing the water/sealant emulsion into a sealant reclaim apparatus; demulsifying and separating the sealant and water in the water/sealant emulsion; recycling the excess sealant to a sealant storage tank to be reused for impregnation; and recycling the water to a water storage tank to be reused for rinsing.

This or other aspects may include one or more of the following optional features. In some embodiments, the sealant comprises a first surfactant that acts as a demulsifier and a second surfactant that acts as a detergent. In some embodiments, the sealant comprises a catalyst and the process further comprises breaking down the catalyst in the excess sealant that is removed from the article. The process may further comprise exposing the water/sealant emulsion to oxygen. In some embodiments, the sealant comprises a stabilizer. The stabilizer may be a free radical scavenger, such as butylated hydroxy toluene. The process may further comprise filtering the water/sealant emulsion to remove solids. In some embodiments, the sealant reclaim apparatus comprises an oil/water coalescing box. In some embodiments, the sealant reclaim apparatus comprises a still section where the water/sealant emulsion stagnates. In some embodiments, the sealant reclaim apparatus comprises a mesh screen or other high surface area material. In some embodiments, the temperature of the water is from about 90 to about 135° F.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Figure 1B:
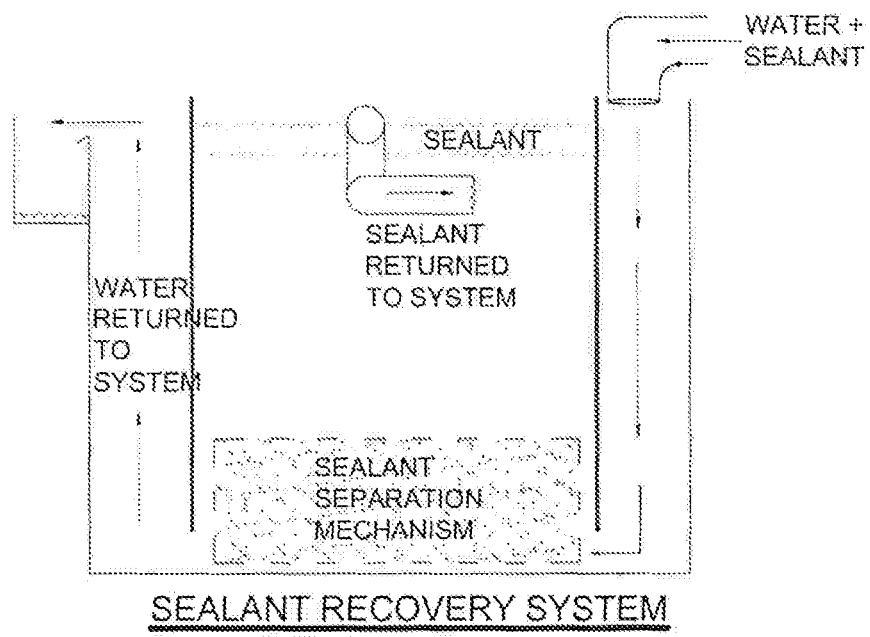
Figure 2:
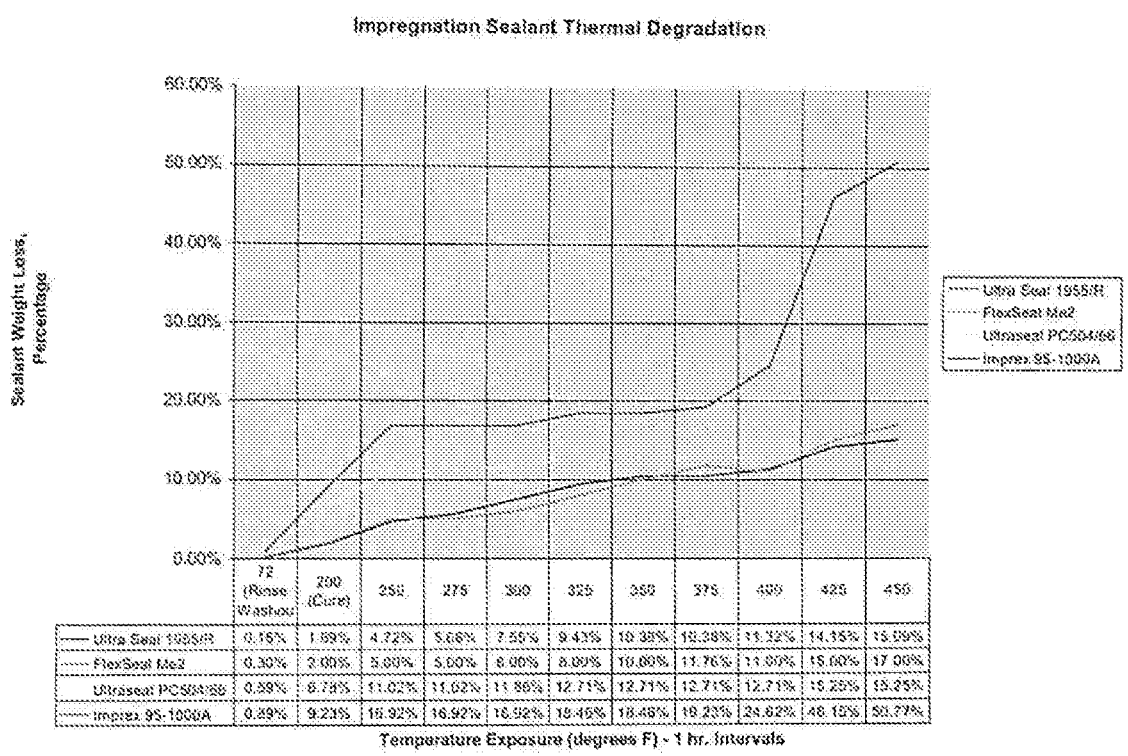

FIG. 1A is a schematic of an impregnation process.
FIG. 1B is a schematic of a wash water recycle process.
FIG. 2 is a chart of weight loss for sealants during thermal degradation testing.
FIGS. 3A-D are photographs showing leakage of impregnation sealed parts after thermal degradation testing.

Corresponding reference numerals indicate corresponding parts throughout the drawings.

DETAILED DESCRIPTION

The present invention relates generally to rinse water treatable impregnation sealant compositions.

The sealant composition generally includes a first monofunctional (meth)acrylate ester. For example, the first monofunctional (meth)acrylate ester may be alkyl methacrylate or lauryl methacrylate. For example, the first monofunctional (meth)acrylate ester may be c12 c14 alkyl methacrylate. The first monofunctional (meth)acrylate ester may be present in the sealant composition in an amount greater than 50 wt %, e.g., 50-80 wt % or 60-70 wt %.

The sealant composition also generally includes a second monofunctional (meth)acrylate ester. For example, the second monofunctional (meth)acrylate ester may be 2-hydroxypropyl methacrylate (HPMA). The second monofunctional (meth)acrylate ester may be present in the sealant composition an amount less than 50 wt %, e.g., less than 40 wt % or less than 30 wt %. The second monofunctional (meth) acrylate ester may be present in the sealant composition in an amount of from about 10-50 wt %, 10-40 wt %, 10-30 wt % or 15-25 wt %.

The sealant composition also generally includes a trifunctional monomer. For example, the trifunctional monomer may be a trifunctional (meth)acrylate ester. For example, the trifunctional (meth)acrylate ester may be trimethylolpropane trimethacrylate. The trifunctional monomer may be present in an amount less than 5 wt %, e.g., less than 3 wt % or less than 2 wt %. The trifunctional monomer may be present in an amount of from about 0.05 to 5 wt %, 0.1 to 2 wt % or 0.5 to 1.5 wt %.

In some embodiments, the sealant composition comprises one or more specialty monomer(s). The specialty monomer(s) may have good thermal and chemical characteristics. In particular, the thermal and chemical characteristics may be better than conventionally used HPMA. Use of specialty monomer(s) in place of some of the HPMA may provide improved sealant performance, as discussed in the examples below. A preferred specialty monomer is epoxidized soy bean oil oligomer. The specialty monomer(s), such as epoxidized soy bean oil oligomer, may be present in an amount of from about 5-20 wt %, e.g., 5-15 wt %, 6-12 wt % or 7-10 wt %.

The sealant composition may also comprise a catalyst (i.e., a free radical initiator). The catalyst may be DuPont Vazo 64. The DuPont Vazo 64 catalyst breaks down due to temperature. It has a rapidly decaying half-life once it is heated. If it is heated rapidly enough at the proper temperature the breakdown releases enough energy to trigger the mass polymerization of the monomers and form a thermoset polymer.

The sealant composition may also include one or more surfactant(s). The surfactant(s) may act as an emulsifier and/or detergent. In a preferred embodiment, the surfactant(s) are temperature dependent, wherein the surfactant(s) act as an emulsifier at low temperature and as a detergent at high temperature. The surfactant(s) allow for easy separation when allowed to stagnate or pass through a coalescer. In some embodiments, the sealant composition includes a first surfactant and second surfactant. The first surfactant aids in washing/emulsifying and is oil soluble (more oil soluble than water soluble) and tends to stay with the sealant. The second surfactant aids in separation/demulsifying and is water soluble (more water soluble than oil soluble) and dissolves into the water. In some embodiments, the first surfactant is Deforest ODP-LF surfactant and the second surfactant is Deforest LF-EP40 surfactant.

The sealant composition must be curable to provide a seal. Impregnation sealant compositions are generally heat curable or anaerobically curable. Heat curable sealants may be cured in a hot cure tank by rinsing with hot water. In a preferred embodiment, the sealant advantageously will not cure out in the hot cure tank unless it is trapped inside a part and its exposure to oxygen is limited. In this preferred embodiment the sealant is both heat and anaerobically curable; that is, it only cures when it is both heated and deprived of oxygen.

The sealant composition may also include a stabilizer. The stabilizer may be blended into the sealant so that when the sealant is exposed to curing temperatures and an anaerobic environment, it quickly breaks down and allows the cross-linking of monomers to take place (i.e., triggers curing of the sealant).

The sealant composition may be hydrophobic, e.g., slightly more hydrophobic than hydrophilic. This can be accomplished by using more hydrophobic monomers than hydrophilic monomers.

The present invention also relates to a zero discharge process of rinsing sealant from an impregnated article, separating sealant from the rinse water, and recycling the sealant and rinse water for reuse.

Porous powdered parts may be subjected to a conventional wet vacuum impregnation process. For example, the impregnating method may be according to Mil spec MIL-STD-276A Method C, wet vacuum and pressure (batch immersion). According to Method C, the components hall be placed in a pressure vessel containing impregnating solution. Each item shall be submerged until it is covered by at least 2 inches of impregnating solution. The vessel shall then be closed and the air exhausted until a vacuum of not less than 29 inches of mercury is attained. The vacuum shall be maintained for a period determined empirically to be sufficient for complete air removal. At the end of the vacuum cycle, a pressure of not less than 50 pounds per square inch shall be applied for a period shown by experience to be sufficient for complete porosity sealing. The pressure shall then be released and the castings removed from the solution. For components with a wall thickness not exceeding ½ inch, the pressure cycle may be omitted.

After impregnation, the parts shall be well drained and the surface, including ducts, vents and pockets, thoroughly rinsed in aqueous solution to remove excess impregnate. A corrosion inhibitor may be added to the final rinse water.

Generally, the impregnation process involves 5 key stages:

1) part preparation—parts should be clean and dry
2) impregnation—air is evacuated from the porosity within the component using a vacuum; the vacuum is released and liquid sealant penetrates the porosity, filling the voids
3) drain—components are centrifuged to drain and recover excess sealant; drained sealant is returned for re-use
4) cold wash—components are rinsed under a cascade of wash water solution removing sealant from all component surfaces
5) hot cure—components are rotated and flooded under a cascade of hot water which polymerizes the liquid sealant within the porosity A schematic of the general process is shown in FIG. 1A. An article is loaded into the resin impregnation tank A where it is impregnated with sealant. The article proceeds to centrifuge B, where excess sealant is drained from the article. The article next proceeds to wash tank C, where it is rinsed with water to remove remaining excess sealant. Finally, the article proceeds to cure tank D, where it is cured via a hot water rinse.

After a part is impregnated with sealant composition, it is rinsed with rinse water to remove excess sealant from the part (i.e., the "cold wash" step). The rinse water becomes mixed with the excess uncured sealant. The zero discharge system described herein separates the sealant and rinse water for reuse.

After the rinse water and sealant become mixed, they form an emulsion and may be separated using oil/water emulsification breaking with coalescer boxes/media. Demulsifying surfactants may be mixed into the sealant to aid separation. Surfactants allow easy separation when allowed to stagnate or pass through coalescer.

The process uses separate wash and cure tanks. The sealant is exposed to air in the wash tank and to oxygen in the water. Oxygen acts as a natural stabilizer so the sealant is self-stabilizing (does not cure) by nature of the design.

During the wash procedure, the sealant is removed from the surfaces of the article (the "work") through various means such as immersion, rotational immersion, spray washing, rotational washing or immersion. It is preferred that the wash water solution is run at room temperature or above. Two or more surfactants are blended into the sealant and can also be added directly to the wash water if so chosen. Each surfactant has a specific purpose. One surfactant (e.g., ODP-LF) acts as a demulsifier and allows the water-sealant emulsion to break easier (as opposed to stagnation) while the second surfactant (e.g., LF-EP40) acts as a detergent to remove the sealant from the surface of the work piece and allows for an emulsion to form. The surfactants reduce the amount of time, equipment, and water necessary for the emulsion to separate and to run an efficient process. The surfactants also ensure that the parts are clean after processing.

The washing process may include the following. First, an emulsion is formed when the sealant comes into contact with water. Second, the emulsion is pumped into a sealant reclaim box and separated into reclaimed sealant and wash water and subsequently returned to the impregnation vessel sealant storage tank and the wash tank, respectively. Third, the catalyst blended into the sealant breaks down and renders the sealant virtually free of any catalyst and as a result will not cure when carryover water/sealant from the wash tank enters the cure tank. The sealant may be re-catalyzed as needed after recycling to replace the catalyst that breaks down.

Without being bound by theory, it is believed that the sealant exiting the wash step does not cure because (1) the emulsion that forms separates the sealant molecules so far apart that there is not enough energy present in the catalyst to crosslink the sealant, (2) the presence of oxygen in the water acts as a stabilizer and offsets the crosslinking abilities of the catalyst, and (3) the BHT blended into the sealant acts as a free radical scavenger and when breakdown of the catalyst begins, the BHT is consumed first before mass polymerization is allowed to take place.

The wash water/sealant mixture enters the sealant reclaim box. In the reclaim box, the emulsified mixture may be filtered for solids such as metal chips, dirt, etc. and pumped into a conventional oil/water coalescing box. The emulsified water is passed through a "still section" of the box where the water is allowed to slow down and may pass through coalescer screens. Sealant rises to the top (as the sealant has a specific gravity lower than water) and is discharged from the box via an overflow and is reused. Wash water is returned to the wash tank for reuse.

FIG. 1B shows a schematic of the recycle process in the reclaim box for separation and re-use of water/sealant mixture exiting the wash tank (or alternatively the cure tank). The water/sealant mixture flows out of the wash tank to a sealant separation mechanism. The mechanism may be, for example, a coalescer box. The separation mechanism separates the water and sealant, which are each returned for re-use in the impregnation system. The sealant recovery system of FIG. 1B is exposed to ambient air. The sealant is returned to a holding tank that the impregnation vessel draws from. The recycled wash water returns to the wash tank. Water/sealant in the cure stage is treated the same. The recycled cure sealant goes to the same holding tank and the recycled cure water goes to the cure tank to be reused.

In order to efficiently separate the sealant from the wash water, several techniques may be implemented. First, the temperature of the wash water may be adjusted for optimal washing characteristics. For example, the temperature may be from ambient to curing temperature, e.g., in some embodiments from 90 to 135° F. Lower temperatures tend to clean harder to wash work due to the wash water working below the cloud points of the surfactants. Separation can be more difficult but not impossible due to the robust nature of the process because the emulsion is more stable. At more elevated temperatures the surfactants act as good detergents whereby removal of the sealant from the work is relatively simple and emulsion breaking is more efficient due to the reduced effectiveness of the surfactants ability to maintain an emulsion. Second, the wash water may be stagnated by allowing the emulsion to pass through the still section of the reclaim box, which allows the demulsifying surfactant to break the emulsion. Third, the wash water may be passed through a mesh screen or other high surface area material, which creates sites for the emulsion to break naturally as the sealant has a higher affinity for plastic or metals more than it does water. Screens may be utilized for efficient separation.

If surfactants break down, additional surfactant can be added to the line at a 1:1 ratio (ODP/EP40) at concentrations as low as 0.01% and as high as 10%.

During the cure procedure, the process is very similar to the wash process with the exception of the temperature of the water. Curing is typically performed at a water temperature of 190° F. or greater. Because of the elevated temperature of the water, surfactant that is introduced due to drag-in is naturally broken down. As a result, the sealant will quickly form a dispersion when mixed in water and be easily separated in the resin reclaim box as it is processed. Because most/all of the catalyst has been consumed in the washing process, the sealant can be kept in the reclaim box at curing temperature for an indefinite amount of time and not polymerize. The sealant/still section of the reclaim box is open to ambient air and as a result allows the sealant to remain in contact with oxygen which acts as a natural stabilizer. This sealant can be re-catalyzed with fresh catalyst and reused. The water is also reused. If concerns remain about possible microbial growth, algae etc. the water can be treated with UV, Carbon, Chlorine or a combination thereof.

The zero discharge process advantageously is environmentally friendly. There is little to no discharge of the sealant-containing rinse water to the sewer. No waste water treatment is needed since all of the water is reused. The only discharge from the system is dirt, oils, etc. introduced by the work and any water that may be left on the work as it exits the system, which is usually negligible due to the flash drying that occurs as the work leaves the cure process at ~190-200° F.

EXAMPLES

Example 1

Sealant Formula ("Sealant A"). Sealant A is prepared with the components as shown in Table 1.

TABLE 1

| | | |
|---|---|---|
| c12 c14 Alkyl methacrylate | 66.67 wt % | 62.8 vol % |
| 2-Hydroxypropyl methacrylate (HPMA) | 20.83 wt % | 22.7 vol % |
| Epoxidized soy bean oil oligomer | 8.6 wt % | 10 vol % |
| Trimethylolpropane trimethacrylate | 0.95 wt % | 1.06 vol % |
| Deforest ODP-LF surfactant | 2 wt % | 2.34 vol % |
| Deforest LF-EP40 surfactant | 0.95 wt % | 1 vol % |
| Keyplast White UV tracer | 1 oz per 100 gallons | |
| Keyplast Dye | 0.25 oz per 100 gallons | |
| Butylated hydroxy toluene (BHT) | 0.15 oz per gallon | |

Example 2

After formulating a batch of sealant, the blend of chemicals was catalyzed and a test ring was impregnated. Once a sample passed initial test ring tests, it was subject to MIL-I-17563C chemical/heat/performance tests as well as thermal cycling tests. Commercially available impregnation sealants Imprex 95-1000A (Control A) and Ultraseal PC504/66 (Control B) were used as controls. All testing was conducted in accordance with MIL-STD-276A, Method C without pressure cycle.

Impregnated test rings with Control A, Control B and Sealant A were subjected to heating in an oven for 100 hours at 300° F./150° C. Test rings were subsequently leak tested. All sealants passed the leak test.

Impregnated test rings with Control A, Control B and Sealant A were frozen to −125° F. for 1 hour then leak tested. The ring was removed from the freezer and placed into an oven at 400° F. for 1 hour. This cycle was repeated 10 times. The Control A sample consistently leaked after freezing then did not leak after heating. The other samples (Control B and Sealant A) did not leak.

Impregnated test rings were exposed to a high temperature cycle of 450° F. for 3 hours. Control A showed leakage over 80% of the test ring surface area. Control B showed approximately 65% leakage. Sealant A showed approximately 3% leakage.

Impregnated test rings were placed into a freezer and held under 50 PSI of pressure while immersed in 50/50 glycol/water solution. The chamber was cooled to 0° F. and reduced 10 degrees every 30 minutes. Control A leaked at −10° F. Control B leaked at −30° F. Sealant A did not leak above −75° F.

Example 3

A thermal degradation test was conducted to determine sealant washout during rinsing/washing operation of impregnation cycle and weight loss during curing. Mil spec mandates a maximum weight loss of 3% not to exceed 10% of volume. The Mil spec also calls for a sealant sample not less than 5 ml to be tested. For internal testing purposes, weight loss was measured as material was impregnated into the test ring, with an approximate volume of 2 ml of material delivered into each test ring. The thermal degradation test also determined the effect of heat on sealant degradation when exposed in high concentrations to oxygen (20% of test ring surface area is sealant) and the percentage of degradation required to cause leakage in test ring. 22-25% appears to be the amount of weight loss required to initiate a leak in the test ring.

FIG. 2 shows a chart of sealant weight loss during the thermal degradation testing for Control A (Imprex 95-1000A), Control B (Ultraseal PC504/66) and Sealant A (Ultra Seal 1955/R) as well as a fourth sealant (Me2) similar to Sealant A.

Control A consistently lost the most weight over the course of the thermal degradation testing. Control B lost more weight initially but plateaued and had a final weight loss similar to Sealant A. Sealant A consistently had the least amount of weight loss over the course of the thermal degradation testing.

FIGS. 3A-D show leakage of the parts impregnated with Sealant A (Ultra Seal 1955/R), Me2 sealant, Control B (Ultraseal PC504/66), and Control A (Imprex 95-1000A) after the thermal degradation test.

Example 4

A thermal shock test was performed. Test rings impregnated with Control A, Control B and Sealant A were placed in freezer at −125° C. for 1 hour, removed and immediately immersed in boiling water and then transferred to oven at 150° C. The samples were cooled, leak tested, and then the cycle was repeated. Control A leaked after 1 cycle (10% leakage). Control B leaked after 1 cycle. Sealant A did not leak.

Example configurations are provided above so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure. Unless otherwise noted, all weights, ratios, and percentages are by weight.

What is claimed is:

1. A sealant composition comprising:
   a first monofunctional (meth)acrylate ester, wherein the first monofunctional (meth)acrylate ester is c12 and c14 alkyl methacrylate;
   a second monofunctional (meth)acrylate ester, wherein the second monofunctional (meth)acrylate ester is 2-hydroxypropyl methacrylate (HPMA);
   a trifunctional monomer; and
   from about 5 wt % to about 20 wt % of an oligomer derived from epoxidized soy bean oil.

2. The sealant composition of claim 1, wherein the HPMA is present in a concentration of less than about 50 wt % in the sealant composition.

3. The sealant composition of claim 2, wherein the HPMA is present in a concentration of less than about 30 wt % in the sealant composition.

4. The sealant composition of claim 1, wherein the oligomer derived from epoxidized soy bean oil is present in a concentration of from about 6 wt % to about 12 wt %.

5. The sealant composition of claim 1, wherein the trifunctional monomer is trimethylolpropane trimethacrylate.

6. The sealant composition of claim 1, further comprising a surfactant.

7. The sealant composition of claim 1, further comprising a stabilizer.

* * * * *